US007222085B2

(12) United States Patent
Stack

(10) Patent No.: US 7,222,085 B2
(45) Date of Patent: May 22, 2007

(54) SYSTEM AND METHOD FOR PROVIDING RECOMMENDATION OF GOODS AND SERVICES BASED ON RECORDED PURCHASING HISTORY

(75) Inventor: Charles Stack, Cleveland, OH (US)

(73) Assignee: Travelport Operations, Inc., Parsippany, NJ (US)

( * ) Notice: Subject to any disclaimer, the term of this patent is extended or adjusted under 35 U.S.C. 154(b) by 0 days.

(21) Appl. No.: 10/872,400

(22) Filed: Jun. 22, 2004

(65) Prior Publication Data

US 2004/0230499 A1    Nov. 18, 2004

Related U.S. Application Data

(63) Continuation of application No. 08/923,293, filed on Sep. 4, 1997, now Pat. No. 6,782,370.

(51) Int. Cl.
G06Q 30/00       (2006.01)
G06F 17/30       (2006.01)
(52) U.S. Cl. ............................... 705/10; 705/14; 705/26
(58) Field of Classification Search .................. 705/10, 705/14, 26, 27, 28, 29; 235/376; 707/10, 707/104.1
See application file for complete search history.

(56) References Cited

U.S. PATENT DOCUMENTS

| 4,870,579 | A | * | 9/1989 | Hey .............................. 705/27 |
| 4,992,940 | A | | 2/1991 | Dworkin |
| 4,996,642 | A | * | 2/1991 | Hey .............................. 705/27 |
| 5,062,074 | A | | 10/1991 | Kleinberger |
| 5,235,509 | A | | 8/1993 | Mueller et al. |
| 5,331,554 | A | | 7/1994 | Graham |
| 5,361,202 | A | | 11/1994 | Doue |
| 5,508,912 | A | | 4/1996 | Schneiderman |
| 5,519,865 | A | | 5/1996 | Kondo et al. |
| 5,528,492 | A | | 6/1996 | Fukushima |
| 5,559,936 | A | | 9/1996 | Poulter et al. |
| 5,583,763 | A | * | 12/1996 | Atcheson et al. ............... 707/3 |
| 5,584,025 | A | | 12/1996 | Keithley et al. |
| 5,592,375 | A | | 1/1997 | Salmon et al. |
| 5,598,557 | A | | 1/1997 | Doner et al. |
| 5,704,017 | A | | 12/1997 | Heckerman et al. |
| 5,724,567 | A | | 3/1998 | Rose et al. |
| 5,734,720 | A | | 3/1998 | Salganicoff |

(Continued)

FOREIGN PATENT DOCUMENTS

EP        0 265 083 A1    4/1988

(Continued)

OTHER PUBLICATIONS

Anon, "HarperCollins Sells 'Hundreds of Books' Online in First Weeks," Electronic Marketplace Reports, vol. 9, No. 3, p. 4, Feb. 7, 1995.*

(Continued)

*Primary Examiner*—Nicholas D. Rosen
(74) *Attorney, Agent, or Firm*—Rothwell, Figg, Ernst & Manbeck PC

(57) ABSTRACT

A computer-implemented method and system utilizing a distributed network for the recommendation of goods and/or services to potential costumers based on a potential customer's selection of goods and/or services and a database of previous customer purchasing history.

13 Claims, 7 Drawing Sheets

U.S. PATENT DOCUMENTS

| | | | | |
|---|---|---|---|---|
| 5,749,081 | A | * | 5/1998 | Whiteis ..................... 707/102 |
| 5,754,938 | A | * | 5/1998 | Herz et al. .................. 725/116 |
| 5,754,939 | A | | 5/1998 | Herz et al. |
| 5,774,670 | A | | 6/1998 | Montulli |
| 5,774,868 | A | * | 6/1998 | Cragun et al. ................ 705/10 |
| 5,790,426 | A | * | 8/1998 | Robinson .................... 702/179 |
| 5,790,935 | A | * | 8/1998 | Payton ........................ 725/91 |
| 5,794,210 | A | | 8/1998 | Goldhaber et al. |
| 5,832,457 | A | * | 11/1998 | O'Brien et al. ............... 705/14 |
| 5,835,087 | A | | 11/1998 | Herz et al. |
| 5,867,799 | A | * | 2/1999 | Lang et al. .................... 707/1 |
| 5,872,850 | A | * | 2/1999 | Klein et al. ................... 705/51 |
| 5,884,282 | A | | 3/1999 | Robinson |
| 5,905,973 | A | | 5/1999 | Yonezawa et al. |
| 5,909,023 | A | | 6/1999 | Ono et al. |
| 5,909,492 | A | | 6/1999 | Payne et al. |
| 5,918,014 | A | | 6/1999 | Robinson |
| 6,006,218 | A | | 12/1999 | Breese et al. |
| 6,018,738 | A | | 1/2000 | Breese et al. |
| 6,020,883 | A | | 2/2000 | Herz et al. |
| 6,029,195 | A | | 2/2000 | Herz |
| 6,041,311 | A | | 3/2000 | Chislenko et al. |
| 6,049,777 | A | * | 4/2000 | Sheena et al. ................ 705/10 |
| 6,058,367 | A | * | 5/2000 | Sutcliffe et al. ............... 705/1 |
| 6,078,740 | A | * | 6/2000 | DeTreville .................... 703/22 |
| 6,088,722 | A | | 7/2000 | Herz et al. |
| 6,092,049 | A | * | 7/2000 | Chislenko et al. ........... 705/10 |
| 6,112,186 | A | * | 8/2000 | Bergh et al. .................. 705/10 |
| 6,266,649 | B1 | * | 7/2001 | Linden et al. ................ 705/26 |
| 6,460,036 | B1 | | 10/2002 | Herz |
| 6,507,872 | B1 | * | 1/2003 | Geshwind .................... 709/236 |
| 2001/0013009 | A1 | * | 8/2001 | Greening et al. ............ 705/10 |
| 2003/0037041 | A1 | | 2/2003 | Hertz |
| 2005/0267818 | A1 | * | 12/2005 | Kaplan ........................ 705/26 |

FOREIGN PATENT DOCUMENTS

| | | |
|---|---|---|
| EP | 0 751 471 A1 | 1/1997 |
| EP | 0 827 063 A1 | 3/1998 |
| GB | 2 336 925 A | 11/1999 |
| WO | WO-97/02537 A1 * | 1/1997 |

OTHER PUBLICATIONS

Anon., "Web Watch Chart: Online Bookstores," Interactive Marketing News, vol. 3, No. 18, Aug. 2, 1996.*
Jackson, T., "Media Futures, Eyes on Amazon," Financial Times, p. 15, Oct. 7, 1996.*
Metcalfe, R., "A Collaborative Filter Can Help You Mine Your Data for Jewels," InfoWorkd, vol. 18, Iss. 49, p. 47, Dec. 2, 1996.*
Martin, M.H., "The Next Big Thing: A Bookstore?" Fortune, vol. 134, No. 11, pp. 168-170, Dec. 2, 1996.*
Glascock, S., "Microsoft Pursing 'Smarter' Software," Computer Reseller News, No. 725, p. 107, Mar. 3, 1997.*
Masud, S., "Ingram Internet: Novel Idea," Computer Reseller News, No. 728, pp. 67, 70, Mar. 24, 1997.*
Anon., "CUC International Inc. Offers Consumers Customized Book Recommendations Through Its Books Stacks Subsidiary," Business Wire, Apr. 22, 1997.*
Snider, M., "Book War Brews on Net," USA Today, Life section, p. D7, May 8, 1997.*
Anon., "Book Stacks Unlimited Announces Poetry Month Exhibit," PR Newswire, Apr. 18, 1997.*
Anon., "CUC International: CUC International Inc. Offers Consumers Customized Book Recommendations Through its Books Stacks Subsidiary, " Business Wire, Apr. 22, 1997.*
Anon., "Interactive Marketing Briefs—Online Marketing: CUC's Book Stacks Adds 'Matchmaking' Features," Interactive marketing News, vol. 4, No. 17, Apr. 25, 1997.*
"How ICL Is Ensuring That Your Retailer Knows About You Than You Know Yourself," Computergram International, Jun. 14, 1996.*
Wilder, Clinton, "E-Commerce Emerges," Information Week, Jun. 14, 1996.*
IBM press release, M2 Presswire, "Wide variety of retailers sign up for World Avenue, IBM's online shopping service," Nov. 12, 9.*
Tadjer, Rivka, "Giving Content a Push," Communications Week, Jun. 2, 1997.*
Broadvision press release, M2 Presswire, "Virgin Net teams with Broadvision to deliver personalised services on Virgin Online," May 15, 1996.*
Lach, Jennifer, "Reading your mind, reaching your wallet," Nov. 1998.*
Hof et al., "Amazon.com: The Wide World of E-Commerce," Business Week, Dec. 14, 9.*
PRNewswire, "Book Stacks Unlimited Announces Poetry Month Exhibit," Apr. 18, 1997.*
Business Wire, CUC International Inc. offers consumers customized book recommendations throught its book stacks subsidiary, Apr. 22, 1997.*
Alexandria Digital Literature, www.alexit.com, no date known.*
Amazon.com, www.amazon.com, no date known.*
"Amazon.com Catapults Electronic Commerce to Next Level With Powerful New Features" Sep. 23, 1997.*
Avery, C. et al., "Recommender Systems for Evaluating Computer Messages," *Communications of the ACM*, vol. 40 (3), pp. 88-89 (1997).
Balabanovic, Marko et al., "Content-based, Collaborative Recommendation," *Communications of the ACM*, vol. 40 (3); pp. 66-72 (1997).
Borchers, A. et al., "Ganging Up On Information Overload," *Computer*, pp. 106-108 (1998).
Brier, Steven E., "Smart Devices Peep Into Your Grocery Cart," *New York Times*, Section G, p. 3, col. 3, Circuits (1998).
Delgado, Joaquin, "Intelligent Collaborative Information Retrieval Actively Learning to Classify and Recommended Documents," (1998) (available at http://citeseer.ist.psu.edu/delgado98intelligent.html).
Delgado, Joaquin et al., "Content-based Collaborative Information Filtering: Actively Learning to Classify and Recommend Documents," *Lecture Notes in Computer Science*, vol. 1435, pp. 206-215 (1998).
Dragan, Richard V., "Advice from the Web," *PC Magazine*, vol. 16 (15), pp. 133-144 (1997).
Faloutsos, Christos et al., "A Survey of Information Retrieval and Filtering Methods," *University of Maryland*, College, Park, pp. 1-22 (undated).
Kautz, H. et al., "Combining Social Networks and Collaborative Filtering," *Communications of the ACM*, vol. 40(3); pp. 63-65 (1997).
Konstan, Joseph A. et al., "GroupLens: Applying Collaborative Filtering to Usenet News," *Communications of the ACM*, vol. 40 (3); pp. 77-87 (1997).
"Net Perceptions Debuts GroupLens Version 3.0 at Internet World Spring: 'Industrial Strength Tool Matures Into Essential Website Technology,'" *Business Wire*, p. 3090007, Dialog File 16, AN 05505690 (1998).
Maltz, D. et al., "Pointing the Way: Active Collaborative Filtering," *CHI '95 Proceedings Papers*, pp. 11-21 (undated).
McMains, A., "New Campaigns," *ADWEEK Eastern Edition*, vol. 39(24), p. 82 (1988).
Miller, B. et al., "Experiences with GroupLens: Making Usenet Useful Again," *1997 Annual Technical Conference*, pp. 219-232 (1997).
Nash, E. L., "Direct Marketing: Strategy, Planning, Execution," 3rd Ed., McGraw-Hill, Inc., pp. 165 and 365-366 (1994).
Resnick, P. et al., "Recommender Systems," *Communications of the ACM*, vol. 40(3) pp. 56-58 (1997).
Resnick, P. et al., "GroupLens: An Open Architecture for Collaborative Filtering of Netnews," *Proceedings of ACM 1994 Conference on Computer Supported Cooperative Work*, pp. 175-186 (1994).
Rucker, J. et al., "Siteseer: Personalized Navigation for the Web," *Communications of the ACM*, vol. 40(3); pp. 73-76 (1997).
Shardanand, Upendra, et al., "Social Information Filtering: Algorithms for Automating 'Word of Mouth,'" pp. 1-8 (undated).

Terveen, L. et al., "A System for Sharing Recommendations," *Communications of the ACM*, vol. 40(3), pp. 59-62 (1997).

"Able Solutions Announces Able Commerce 2.6," *PR Newswire* (1998).

"CDnow Rated Top Music Site by eMarketer, The Authority on Business Online; CDnow Makes Online Buying 'Easy, Inexpensive and Fun,'" *PR Newswire* (1998).

"COSMOCOM; Has released its CosmoCall IP ACD Software," *Computer Telephony*, p. 124 (1998).

"Fort Point Partners Teams With LikeMinds to Offer Breakthrough Personalization Technology for Increased Sales Online," *Business Wire*, p. 3110064, Dialog File 16, AN 05510541 (1998).

"GroupLens Recommendation Engine to Standardize Internet Personalization For Singapore's Online Technologies Consortium," *Business Wire*, Dialog File 20, AN 01951318 (1998).

"Home Box Office Selects Like Minds Personalization Software for Second Network Site," *PR Newswire*, p. 1117SFM023, Dialog File 148, AN 09869396 (1997).

"ICAT Electronic Commerce Suite Takes 'Best of Show' Award at Webinnovation 97," *PR Newswire* (1997).

"ICAT Corporation: iCat's Commerce Suite Makes Setting Up Shop On Net Even Easier Than High Street," *M2 Presswire* (1997).

A page of PTO-892 form citing "Internet World—IBM To Expand E-Comm Features," Neewsbytes News Network (1996).

"LinkShare Launches Affiliates Profiling Software: First to Integrate Personalization Software Into Affiliates Program," *PR Newswire*, Dialog File 813, AN 1232636 (1998).

Net Perceptions, Inc., "Building Customer Loyalty and High-Yield Relationships Through GroupLens Collaborative Filtering," pp. 1-9 (1996).

"Net Perceptions Closes Second Round of Financing: GroupLens Secures No. 1 Recommendation System Spot With Strong Endorsement by Investment Community," *Business Wire*, p. 3020013, Dialog File 16, AN 05495619 (1998).

Littman, Jonathan, "The Book on Amazon.com; 'Earth's Biggest Bookstore' Helped to Pioneer Shopping on the Web. But Can It Survive with Barnes & Noble Now in the Fray?," *Los Angeles Times Magazine*, p. 18, Sunday, Home edition (Jul. 20, 1997).

Burke, Robin D., et al., "Knowledge-Based Navigation of Complex Information Spaces", Artificial Intelligence Laboratory University of Chicago, University of Chicago, Illinois, 60637, 7 pgs.

Civil Action No. 05-414-JJF, *CD Intellectual Property Holdings LLC v. Amazon.com, Inc.*, "Defendant Amazon.com's Response to Plaintiff CD Intellectual Property Holdings LLC's First Set of Interrogatories", Jan. 9, 2006, 42pp, U.S. District Court for the District of Delaware (partially redacted).

Hill, Will, et al., "Recommendating And Evaluating Choices In A Virtual Community of Use" ACM, Computer Graphics and Interactive Media Group Home Page, 11pp. Morristown, New Jersey.

Karlgren, Jussi, "An Algebra for Recommendations", SYSLAB, Oct 1990, 2 Cvr pages, 1-9, Stockholm University.

Karlgren, Jussi, "Newsgroup Clustering Based On User Behavior—A Recommendation Algebra", Mar. 1994, 15pp.

Kok, Andreas Jozef, "User Modelling For Data Retrieval Applications", 6 Cvr pages and pp. 1-3, 5-65, 67-85, 87-96, 98-107, 109-123 (Oct. 2, 1990).

Metral, Max Edward, "MotorMouth: A Generic Engine for Large-Scale, Real-Time Automated Collaborative Filtering", Media Arts and Sciences School Of Architecture and Planning, May 15, 1995, 6pp (cvr and table of contents), pp. 12-74 and Bibliography 2 pp., Massachusetts Institute of Technology. US.

Net Perceptions, Inc., "Building Customer Loyalty and High-Yield Relationships Through GroupLens Collaborative Filtering," pp. 1-9 (Nov. 19, 1996).

Nichols, David M., "Recommendation and Usage in the Digital Library", Cooperative Systems Engineering Group Technical Report Ref: CSEG/2/1997, pp. 1-15 CSEG, Computing Department, Lancaster University.

Morita, Masahiro et al., "Information Filtering Bases on User Behavior Analysis and Best Match Text Retrieval," Japan Advanced Institute of Science and Technology (JAIST),Proceedings of the 17th Annual International ACM SIGIR Conference on Research and Development in Information Retrieval (Dublin, Ireland) pp. 272-281 (Jul. 3-6, 1994).

Shardanand, Upendra, "Social Information Filtering for Music Recommendation", Department of Electrical Engineering and Computer Science, Sep. 1994, 93pp, Massachusetts Institute of Technology.

Labys, Paul, "Good results from basic clustering techniques" (email) Jun. 9, 1996, 1 page.

Labys, Paul, "Attached file of Jul. 8, 1996, detailed notes in README" (email) Jul. 10, 1996, 2 pages.

Labys, Paul, "Implementing the Al Engine" (email) Sep. 16, 1996, 2 pages.

Labys, Paul, "Current Project Status" (email) Nov. 4, 1996, 1 page.

Labys, Paul, "Re Topology for Gift Selector" (email) Nov. 19, 1996, 1 page.

Labys, Paul, "Al Progress Report" (email) Jan. 15, 1997, 1 page.

Labys, Paul, "API for Online System" (email) undated, 1 page.

Labys, Paul, "AI Working Prototype Interface Address (fwd)" (email) Mar. 5, 1997, 1 page.

Undated Screenshot, CDNow: A1 Test (with handwritten notes), 1 page.

Labys, Paul, "Check Out The CDNow Web Page!" (email) Mar. 6, 1997, 1 page.

Herz, Fred, "Other CDNow Product Categories" (email) Mar. 18, 1997, 1 page.

Ungar, Lyle, "Wharton Ecommerce Forum" (email) Mar. 20, 1997, 1 page.

Ungar, Lyle, "CDNow Demo (fwd)" (email) Mar. 24, 1997, 1 page.

Labys, Paul, "CDNow Demo (fwd)" (email) Mar. 25, 1997, 1 page.

Herz, Fred, "White Paper for Collaborative Filtering Product" (email) Apr. 17, 1997, 7 pages.

Herz, Fred, Unger, Lyle, Labys, Paul, "A Collaborative Filtering System for the Analysis of Consumer Data" (Version: Apr. 28, 1997) 10 pages.

Unger, Lyle, "Draft of Proposal to CDNow" (email) May 21, 1996, 2 pages.

Ungar, Lyle, "CDNow" (email) May 23, 1996, 1 page.

Labys, Paul, "We Now Have 54 Megs of CDNow Data" (email) Jun. 1, 1996, 4 pages.

\* cited by examiner

CLEAR AND PRESENT DANGER

Search Type: TITLE          Number of Books: 6

| | Title | Author | Date | Bind | Price |
|---|---|---|---|---|---|
| | Clear and Present Danger | Clancy, Tom | 08/94 | PAP | $5.94 |
| | Clear and Present Danger (Thorndike Large Print Series) | Clancy, Tom | 10/90 | TRD | $20.36 |
| | Clear and Present Danger | Clancy, Tom | 08/89 | TRD | $21.21 |
| | Clear and Present Danger | Clancy, Tom/ Stiers, David Ogden (Unk) | 07/94 | TRD | $17.00 |
| ☐ | Clear and Present Danger | Clancy, Tom | 07/96 | PAP | $6.38 |
| ☐ | Clear and Present Danger/Multi-Track Audio Cassettes | Clancy, Tom | 04/90 | TRD | $38.95 |

CLEAR AND PRESENT DANGER

By

Clancy, Tom

How Many Copies ?

PUBLISHER: BRKP
CATEGORY: *Movies*
PUB DATE: 08/94
BINDING: *Paperback*
PRICE: US$6.99

ISBN: 0425144372
BOOKMARKS: 5
*YOU SAVE: $1.05 (15%)*

YOUR PRICE: $5.94
MEMBER PRICE: $4.89

*AFFINITY* SM BY SAME PEN

FIG. 3D af·fin·i|ty n. 1 similarity 2 close relationship; connection 3 liking or inclination toward something With _Affinity_, our own agent-based technology, you can explore the tastes of our other customers who've bought this same book. It's completely anonymous, and requires no effort. Finally, a helpful recommendation service based on _real people's real interests!_ Based on 5 years of our customer's buying history, we think you might enjoy the book(s) listed below, purchased by customers who enjoyed _Clear and Present Danger._

| | Title | Author | Confidence In This Match |
|---|---|---|---|
| ▭ | _Eaters of the Dead_ | –Crichton, Michael | 100% |
| ▭ | _Disclosure_ | –Crichton, Michael | 100% |
| ▭ | _Red Storm Rising_ | –Clancy, Tom | 100% |
| ▭ | _Patriot Games_ | –Clancy, Tom | 100% |
| ▭ | _The Sum of All Fears_ | –Clancy, Tom | 100% |
| ▭ | _Debt of Honor_ | –Clancy, Tom | 100% |

▭ denotes additional information.

SYSTEM AND METHOD FOR PROVIDING RECOMMENDATION OF GOODS AND SERVICES BASED ON RECORDED PURCHASING HISTORY

CROSS-REFERENCE TO RELATED APPLICATION

This application is a continuation of pending application Ser. No. 08/923,293, filed Sep. 4, 1997 now U.S. Pat. No. 6,782,370.

BACKGROUND OF THE INVENTION

1. Field of the Invention

The present invention relates to the use of computer systems to facilitate the recommendation of goods or services utilizing a distributed network such as the Internet, specifically to provide recommendations of goods or services that may be of interest to potential customers based on a potential customer's selection of goods or services and a database of previous customer history with respect to the selected goods or services.

2. Description of the Background Art

Providing recommendations of goods or services of interest to customers in a computer system environment has been based on demographic profiles and usually requires extensive customer participation and divulgence of personal information (for example, the input of: age, profession, hobbies, gender, . . . . ) to create a user profile, which is then compared against other user profiles to determine possible items of interest to the user. The need for extensive customer input limits the appeal of these feedback systems because they require the user to expend substantial time and effort in addition to revealing personal details in order to obtain the requested information.

The present invention allows potential customers to utilize a computer system interfaced with a distributed network to obtain recommendations of goods or services that may be of interest to them while substantially reducing the degree of customer input required in comparison to prior art systems. Instead of relying on the personal information provided by each potential customer as a basis for determining recommendations, the subject invention utilizes a customer activity history database to facilitate the determination of recommendations.

SUMMARY OF THE INVENTION

A method for recommending goods or services is provided which allows the user of a computer system connected to a distributed network such as the Internet to receive recommendations of goods or services of potential interest based on a particular good or service selected by the user and previous customer buying history. The previous customer buying history is assembled by passively tracking and retaining or storing all purchasing decisions by previous customers.

The user first selects a particular good or service he may be interested in obtaining. This selection is treated as filter data input to a host computer's data processor. The data processor then compares this input data with a customer activity history database to determine if there are any possible goods or services that can be recommended to the user. If there are possible recommendations the user can choose to have those goods or services recommended to him by the system. The data processor then utilizes the filter data input and the customer history database to determine all of the customers who have purchased the particular good or service selected by the user and all the goods or services those customers have purchased. The goods or services purchased in common by this group of customers are returned as filtered output data and displayed to the user as recommended goods or services.

According to another aspect of the invention, a confidence factor indicating the level of confidence in the strength of the recommendation may be provided.

BRIEF DESCRIPTION OF THE DRAWINGS

FIG. 3C is a depiction of the search results page as displayed to the user where the user can select a particular book.

FIG. 3D is a depiction of the book selection page as displayed to the user where the user can select to have recommendations of potential interest returned to him.

FIG. 3E is a depiction of the recommendations result page as displayed to the user.

DETAILED DESCRIPTION OF THE PREFERRED EMBODIMENT

In the preferred embodiment, books are recommended over the Internet using World Wide Web technology although any communication medium could be used including distributed networks such as Local Area Networks (LANs), Wide Area Networks (WANs), or Electronic Bulletin Board Systems (BBSs). For purposes of illustration, the preferred embodiment will be described in the context where the goods or services are books; however, the invention may be practiced with respect to any good or service.

Figure 1:
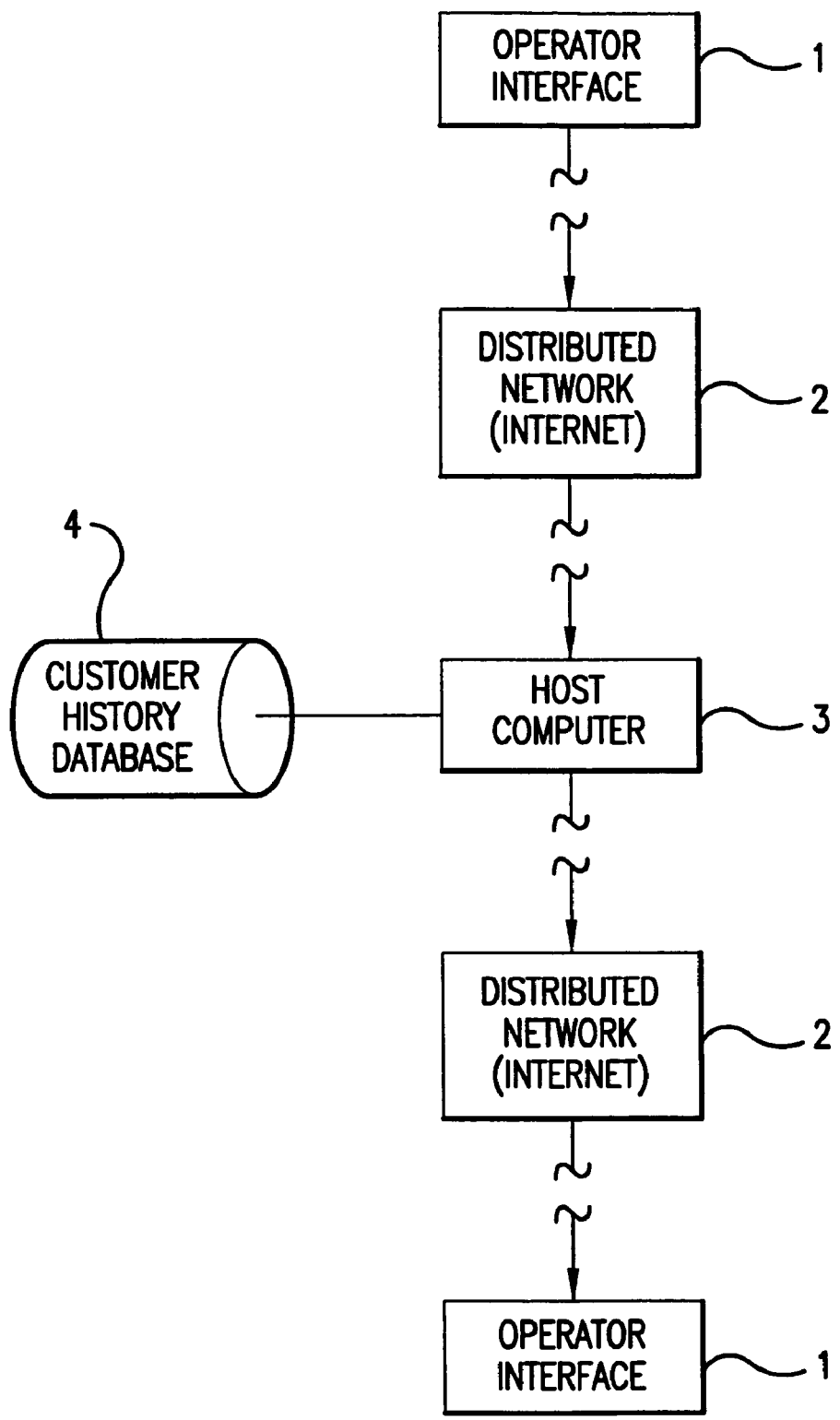
FIG. 1 is a block diagram showing one preferred embodiment of the present invention.
Figure 2:
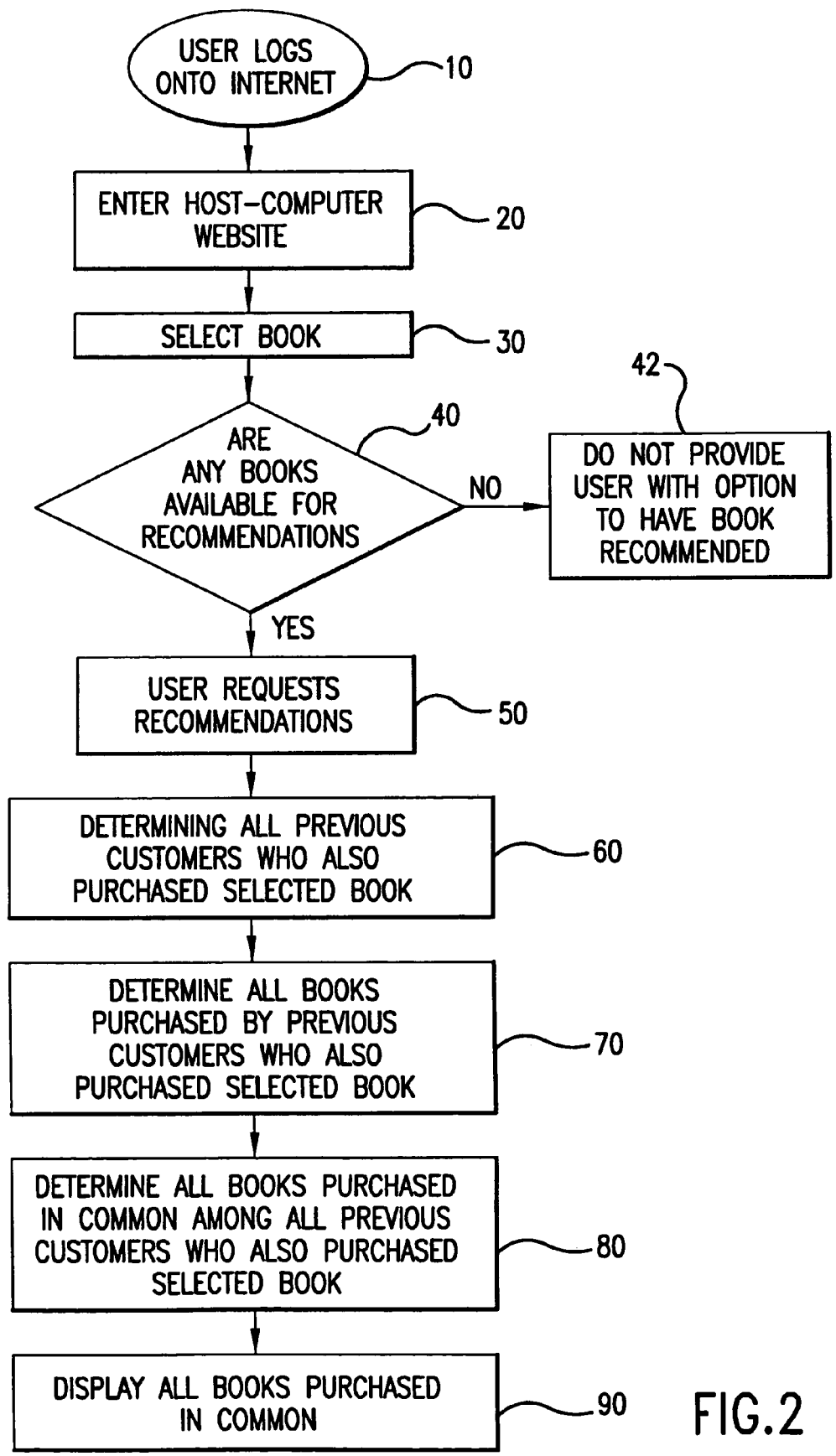
FIG. 2 is a flow diagram showing one preferred embodiment of user interaction with a customer history database.

With reference to FIG. 1 a remote user utilizing an operator interface 1 accesses a distributed network communication medium 2, such as, for example, the Internet via the World Wide Web. The operator interface 1 may be any computer with a modem, network card or any other device including wireless devices utilized in computer systems to facilitate the transmission of data and may be found in personal computers used in households, business offices or schools. The computer can be any device capable of processing data such as computers based on technology from Apple Computer (e.g., The Macintosh, The Performa, the PowerMac series, etc.) or technology based on processors by Intel, AMD, Cyrix, etc. and commonly referred to as IBM compatibles. It should be noted however that a user need not have a computer (i.e., a machine with processing power); a so-called "dummy terminal" being sufficient. Once logged onto the Internet, the user accesses a host computer 3 by specifying a website domain address, as is well known. The host computer 3 contains information regarding goods or services (such as books) for sale and also contains a customer purchasing history database 4 which stores data describing all purchases of previous customers.

One preferred method of retrieving recommendation information will be explained with reference to FIGS. 1, 2 and 3A–3E, and will be described with particular reference to retrieving information regarding the purchase and recommendation of books.

At step 10, a user logs onto the Internet network, such as by obtaining access through an Internet service provider, and at step 20, the user enters the website by retrieving information from host computer 3.

Figure 3A:
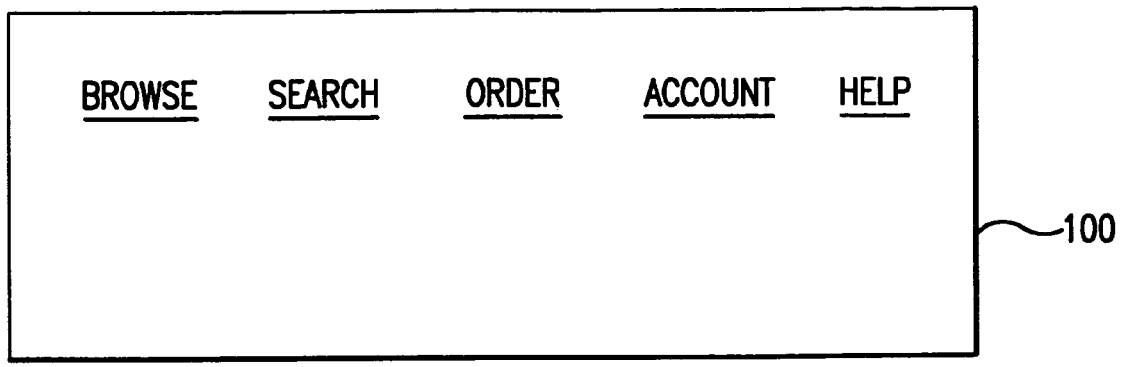
FIG. 3A is a depiction of the home page of the website as displayed to the user which provides the search option to the user.

A screen display 100 as shown in FIG. 3A provides various hypertext selections for various actions to be performed. As indicated, a user may choose to browse, search, order, retrieve account information, or request help.

Figure 3B:
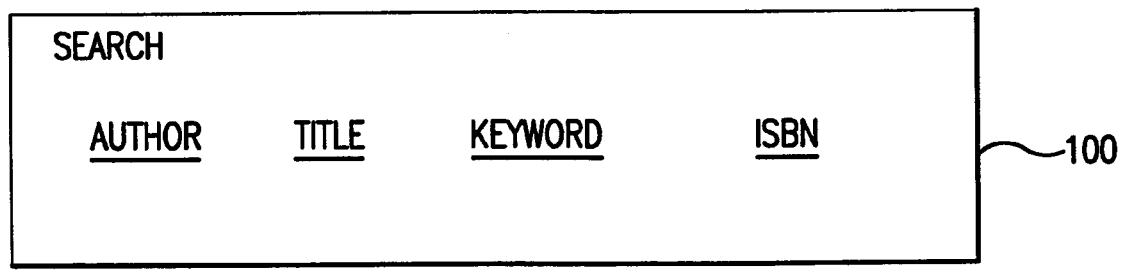
FIG. 3B is a depiction of the search page as displayed to the user where the user can search by author, title, keyword, or ISBN.

The user can select a book by choosing the Search function in FIG. 3A. Once the search function has been selected, the user may search for the book by either author, title, keyword or a International Standard Book Number (ISBN) as shown in FIG. 3B.

The user may utilize any of these methods to select a particular title. In FIG. 3C, a user has selected the title Clear and Present Danger by author Tom Clancy. As shown in FIG. 3C, any particular title may be available in a number of different formats or editions. Once a specific title is selected from among the choices in FIG. 3C, the host computer 3 determines if there are any possible recommendations available for this particular book. If no other books are available as recommendations, the host computer will not give the user the option to request recommendations; the user can still purchase the selected title or request other information concerning this book. If other books are available as recommendations the option to request recommendations is supplied to the user in the form of a hypertext display as shown in FIG. 3D as the Affinity™ service.

The system determines whether other books are available to be recommended by consulting the customer history database 4. The customer history database includes three relational database tables consisting of Customers, Orders and Items. The tables are related to each by keying unique customer IDs in the Customer table to order numbers in the Orders table and product identification numbers in the Items table. For example, books may be identified by their unique ISBN in the Items table. When a user has selected a particular book, the system searches the database 4 to determine all previous customers who have purchased that book. If there exist in the database at least two other customers who have purchased the user-selected book and those at least two customers have also purchased other books (or other products) in common, then the Affinity™ hypertext link will appear in the display page for the selected book. If the search does not find at least two customers who have purchased the selected book and who have also purchased another book in common, the Affinity™ hypertext link will not appear in the display page. Once the user activates the Affinity™ hypertext link, the books purchased in common will be displayed, as shown in FIG. 3E.

Another aspect of the invention is the indication of a "confidence match" factor as shown in FIG. 3E. The confidence factor is calculated based on the frequency of appearance of the recommended books (or other items) in the histories of the customers who have purchased the selected book (or other item). For example, if ten customers who purchased book A also purchased book B, the confidence factor in the recommendation of book B to a user who selected book A would be 100%. If on the other hand only 7 of the ten customers who purchased book A also purchased book B, the confidence factor for book B would be 70%. As previously explained above, if none of the customers who purchased book A also purchased at least one other book in common, the Affinity™ hypertext link would not be displayed.

The user makes a request for recommended books by selecting the Affinity™ hypertext using a tracking device such as a mouse. The request is then transmitted to the host computer 3 via the Internet 2 and is processed at the host computer 3. To facilitate the processing and storage of data each customer is assigned a unique customer ID and each book is identified by its unique ISBN. The host computer utilizes these elements to track and retain the identification of all customers and their purchases. The retained customer purchasing history is stored in the customer history database 4 and is accessed whenever a request for recommendations is submitted to the host computer.

Utilizing the customer history database 4, the host computer 3 searches all the books purchased by all the customers who have purchased the particular book that was selected by the user. Titles which have been purchased in common among the customers are selected as recommendations for the user. This collaborative filter or intelligent agent is superior to other methods because it uses actual customer purchasing history to assemble recommendations. It does not require any customer effort nor impinge on customer privacy. The recommendations are then transmitted to the user via the Internet 2 and displayed on the user interface 1 as shown in FIG. 3E.

Figure 4:
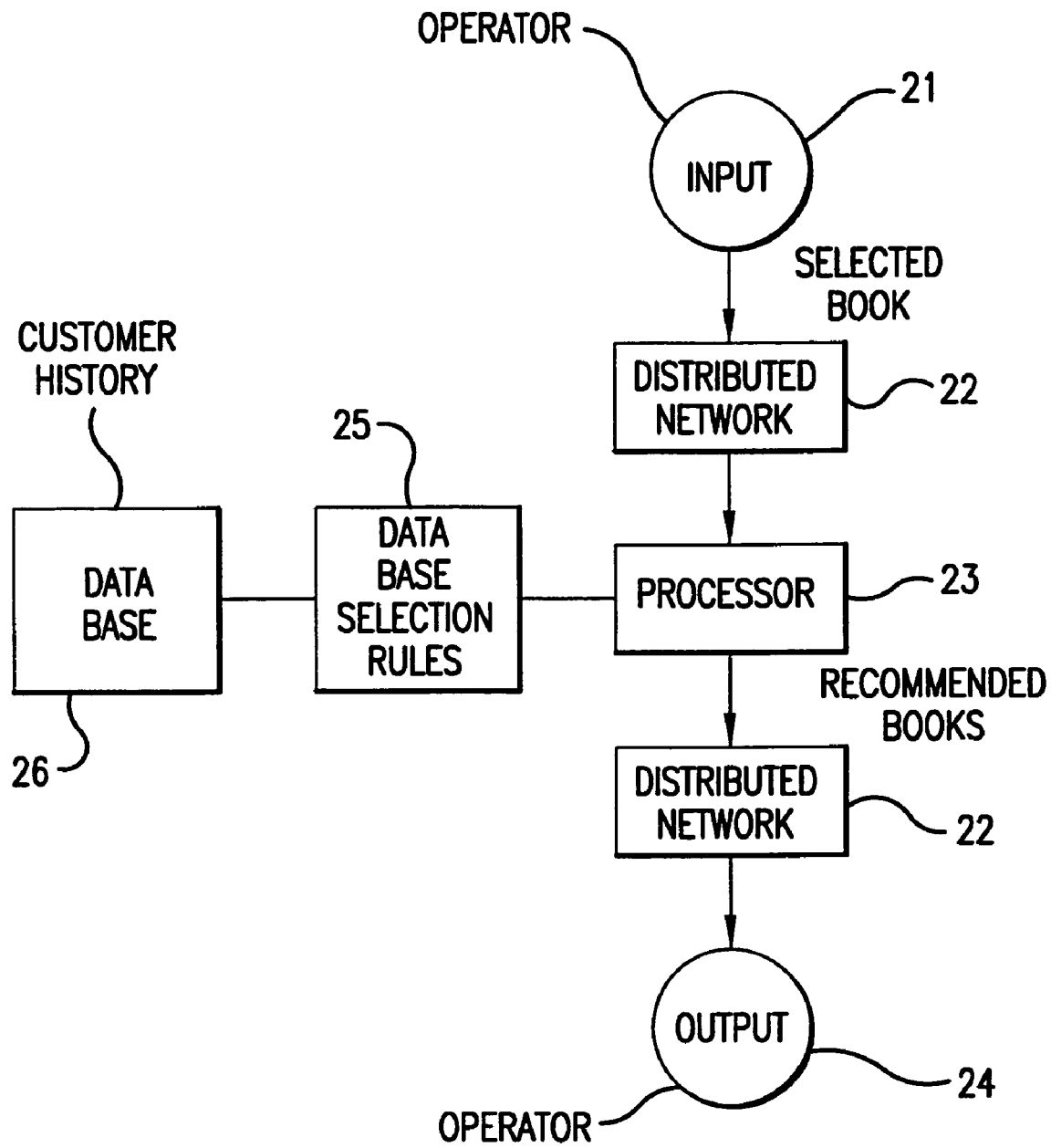
FIG. 4 is a flow diagram showing one preferred embodiment of the computer-implemented system's structure and data flow.

FIG. 4 illustrates one example of the system structure and data flow. An operator enters input data 21 consisting of a selected book. This input data 21 is transmitted from the operator to the processor 23 via a distributed network 22 similar to the distributed networks described earlier with reference to block 2 in FIG. 1. The processor utilizes database selection rules 25 as explained above in conjunction with the input data 21 to determine the recommendations that will be accessed from the database 26 which contains data on previous customer purchasing history. The recommendations are then transmitted from the processor 23 to the operator as output data 24 via a distributed network as previously described with reference to FIG. 1 block 2.

The invention having been described, it will be apparent to those skilled in the art that the same may be varied in many ways without departing from the spirit and scope of the invention. Any and all such modifications are intended to be included within the scope of the following claims.

The invention claimed is:

1. A computer-implemented method for the recommendation of items to a potential customer over a distributed network based on customer buying history, the computer-implemented method utilizing a storage system and a processing system adapted to receive and transmit data to a computer utilized by the potential customer, the method comprising:

storing in the storage system information that reflects customer buying history data;

electronically transmitting, from the processing system to the computer, a web page having a hyperlink associated with a first purchasable item, the hyperlink enabling the potential customer to access information advertising the first purchasable item without purchasing or rating the first purchasable item, the information advertising the first purchasable item including pricing information for the first purchasable item;

receiving, at the processing system, information transmitted by the computer, wherein the information was transmitted by the computer in response to the potential customer selecting the hyperlink;

in response to receiving the information transmitted by the computer, the processing system filtering the information stored in the storage system using only an item identifier identifying the first purchasable item as filter data to identify a second purchasable item purchased by at least one previous customer who had also previously purchased the first purchasable item;

the processing system transmitting over the distributed network to the computer the information advertising the first purchasable item; and the processing system transmitting to the computer over the distributed network information relating to the second purchasable item, wherein the processing system filters the information stored in the storage system using the filter data and transmits to the computer the information relating to the second purchasable item regardless of whether the potential customer bought the first purchasable item and regardless of whether the potential customer rated the first purchasable item.

2. The method of claim 1, wherein the step of transmitting information relating to the second purchasable item is performed in response to a request for information regarding items similar to the first purchasable item.

3. The method of claim 1, wherein at least one of the first purchasable item and the second purchasable item comprises a book.

4. The method of claim 1, wherein said filtering step comprises, upon receiving the information transmitted by the computer, the processing system executing commands to search the information that reflects customer buying history data for at least one record that contains the filter data.

5. The method of claim 4, wherein said filtering step comprises, upon receiving the information transmitted by the computer, the processing system executing commands to search the information that reflects customer buying history data for previous customers who had also purchased the first purchasable item and then searching among the previous customers who had also purchased the first purchasable item for two or more previous customers who had purchased the second purchasable item.

6. The method of claim 1, wherein the information relating to the second purchasable item is transmitted only if a number of customers who have purchased both the first purchasable item and the second purchasable item is greater than or equal to a predetermined value.

7. A computer-implemented system for the recommendation of items to a potential customer over a distributed network based on customer buying history, said system comprising:

a storage system storing information that reflects customer buying history; and a processing system configured to:

electronically transmit, from the processing system to a computer utilized by the potential customer, a web page having a hyperlink associated with a first purchasable item, the hyperlink enabling the potential customer to access information advertising the first purchasable item without purchasing or rating the first purchasable item, the information advertising the first purchasable item including pricing information for the first purchasable item;

receive over the distributed network information transmitted by the computer, wherein the information was transmitted by the computer in response to the potential customer selecting the hyperlink;

in response to receiving the information transmitted by the computer, filter the information that reflects customer buying history data using only an item identifier identifying the first purchasable item as filter data to identify a second purchasable item purchased by at least one previous customer who had also previously purchased the first purchasable item;

transmit over the distributed network to the computer information advertising the first purchasable item; and transmit over the distributed network to the computer information relating to the second purchasable item, wherein the processing system is configured to filter the information stored in the storage system using the filter data and transmits to the computer the information relating to the second purchasable item regardless of whether the potential customer bought the first purchasable item and regardless of whether the potential customer rated the first purchasable item.

8. The system of claim 7, wherein at least one of the first purchasable item and the second purchasable item comprises a book.

9. The system of claim 7, wherein the processor is further configured to transmit information relating to the second purchasable item in response to a request for information regarding items similar to the first purchasable item.

10. A computer implemented method for selling books and making recommendations of books to a potential customer over a distributed network based on customer buying history, the computer-implemented method utilizing a processing system adapted to receive and transmit data to a computer utilized by the potential customer, the method comprising:

receiving at the processing system from the computer a search request including one or more search terms;

in response to receiving the search request, the processing system searching data stored in a storage system to identify one or more books that correspond to the search request;

electronically transmitting from the processing system to the computer a web page having a hyperlink associated with each of the one or more books that correspond to the search request, each hyperlink enabling the potential customer to access information advertising the associated book without purchasing or rating the associated book, the information advertising the associated book including pricing information for the associated book;

receiving, at the processing system, information transmitted by the computer, wherein the information was transmitted by the computer in response to the potential customer selecting a one of said hyperlinks;

in response to receiving the information transmitted by the computer, the processing system filtering information that reflects customer buying history data stored in the storage system using only an identifier identifying the book associated with the selected hyperlink as filter data to identify a second book purchased by at least one previous customer who had also previously purchased the associated book;

the processing system transmitting to the computer the information advertising the associated book;

the processing system transmitting to the computer information relating to the second book, wherein the processing system filters the information stored in the storage system using the filter data and transmits to the computer the information relating to the second book regardless of whether the potential customer bought the associated book and regardless of whether the potential customer rated the associated book.

11. The method of claim 10, wherein the search terms comprise at least one term selected from the group comprising a name of person, a title of a book, and a book-identifying number.

12. In a client-server computer system comprising a client computer and a processing system implementing an on-line store and having one or more servers, a method comprising:
  (a) the processing system electronically transmitting to the client computer a web page having a hyperlink associated with a first purchasable item, the hyperlink enabling a user of the client computer to access information advertising the first purchasable item without purchasing or rating the first purchasable item, the information advertising the first purchasable item including pricing information for the first purchasable item,
  (b) the processing system electronically receiving information transmitted from the client computer, wherein the information was transmitted by the client computer in response to the user of the client computer selecting the hyperlink; and
  (c) the processing system, in response to receiving the information transmitted by the computer:
    (i) electronically determining one or more items purchased by at least one customer who also purchased the first purchasable item, the determining carried out using as filter data only an identifier corresponding to the first purchasable item, and
    (ii) electronically transmitting to the client computer the information advertising the first purchasable item and information informing the user that one or more items were purchased by at least one customer who also purchased the first purchasable item, wherein the processing system transmits the information informing the user that one or more items were purchased by at least one customer who also purchased the first purchasable item regardless of whether the user bought the first purchasable item and regardless of whether the user rated the first purchasable item.

13. The method of claim 12, further comprising the processing system:
  (1) electronically transmitting to the client computer a request hyperlink enabling the user of the client computer to request information relating to the one or more items purchased by at least one customer who also purchased the first purchasable item;
  (2) electronically receiving request information transmitted from the client computer, wherein the request information was transmitted by the client computer in response to the user selecting the request hyperlink; and
  (3) in response to receiving the request information, transmitting to the client computer information identifying the one or more items purchased by at least one customer who also purchased the first purchasable item.

* * * * *